(12) United States Patent
Taima

(10) Patent No.: US 7,649,035 B2
(45) Date of Patent: Jan. 19, 2010

(54) THERMOPLASTIC COMPOSITE MATERIAL AND OPTICAL ELEMENT

(75) Inventor: Yasuo Taima, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 585 days.

(21) Appl. No.: 11/295,488

(22) Filed: Dec. 7, 2005

(65) Prior Publication Data

US 2006/0128869 A1 Jun. 15, 2006

(30) Foreign Application Priority Data

Dec. 10, 2004 (JP) .............................. 2004-358369

(51) Int. Cl.
 *C08K 7/00* (2006.01)
(52) U.S. Cl. ..................................... 523/220
(58) Field of Classification Search .................. 523/220
 See application file for complete search history.

(56) References Cited

U.S. PATENT DOCUMENTS 7,081,295 B2 * 7/2006 James et al. ................. 428/327

FOREIGN PATENT DOCUMENTS

| JP | 2002-105131 | 4/2002 |
|---|---|---|
| JP | 2002-105325 | 4/2002 |
| JP | 2002-207101 | 7/2002 |
| JP | 2002-241560 | 8/2002 |
| JP | 2002-241569 | 8/2002 |
| JP | 2002-241592 | 8/2002 |
| JP | 2002-241612 | 8/2002 |
| JP | 2002-303701 | 10/2002 |
| JP | 2003-073563 | 3/2003 |
| JP | 2003-240901 | 8/2003 |

OTHER PUBLICATIONS

Becker, C. et al., "Optical and Thermomechanical Investigations on Thermoplastic Nanocomposites with Surface Modified Silica Nanoparticles", SPIE, vol. 3469, pp. 88-98, Jul. 1998.
Braune, P. et al., "Tantalum oxide nanomers for optical applications", SPIE, vol. 3469, pp. 124-132, Jul. 1998.

* cited by examiner

*Primary Examiner*—Edward J Cain
(74) *Attorney, Agent, or Firm*—Finnegan, Henderson, Farabow, Garrett & Dunner, L.L.P.

(57) ABSTRACT

A thermoplastic composite material comprising: (i) a thermoplastic resin comprising an organic polymer; and (ii) particles having an average diameter of 1-30 nm dispersed in the thermoplastic resin, wherein the particles contain two or more kinds of inorganic particles having different refractive indexes.

13 Claims, 1 Drawing Sheet

THERMOPLASTIC COMPOSITE MATERIAL AND OPTICAL ELEMENT

This application is based on Japanese Patent Application No. 2004-358369 filed on Dec. 10, 2004 in Japanese Patent Office, the entire content of which is hereby incorporated by reference.

FIELD OF THE INVENTION

The present invention relates to a thermoplastic composite material which has small thermal variation ratio in the refractive index and is suitably applied for a lens, filter, grating, optical fiber and planar light conducting path, and an optical element using the material.

BACKGROUND OF THE INVENTION

An optical pickup is installed in information apparatus such as a player, a recorder and a drive for leading out or recording information from or to an optical information recording medium, referred also to as simply a medium, such as an MO, CD and DVD. The optical pickup apparatus has an optical element such as a lens for irradiating light generated from a light source having a prescribed wavelength to the medium, and for receiving the reflected light by a light receiving element unit, and a lens for condensing the light on the reflective surface of the medium or the light receiving element.

A plastic is preferably applied for the material of the optical element of the optical pickup apparatus because the optical element can be produced with low cost by a means such as an injection molding. A copolymer of a cyclic olefin and an α-olefin is known as the plastic capable for applying the optical element (for example, refer to Patent Document 1).

In an information apparatus capable of leading and writing information to plural kinds of recording media such as a CD/DVD player, it is necessary that the optical pickup has a constitution capable of corresponding to the wavelength of the light to be applied to each of the media and the shape thereof. In such the case, the optical element is preferably one commonly applicable to both of the media from the viewpoint of cost and picking up property.

In the optical element unit using plastic as a material, it is desirable that the plastic is a material having optical stability similar to that of a glass lens. The optical plastic material such as the cyclic olefin, for example, has sufficiently improved stability in the refractive index with respect to humidity, but the improvement in the stability of the refractive index is not fully sufficient in the present stage.

Various methods have been proposed for compensating the refractive index of such the plastic lens by using a particle filler.

The particle filler is employed for compensating the refractive index of the optical plastic. The plastic can hold sufficient transparency for the lens without light scattering caused by the filler by the use of the filler of sufficiently small particle size. Technology for enhancing the refractive index of the plastic by the addition of the particles is described in Non-patent Documents 1 and 2, for example.

The transparent plastic materials have been employed for various uses in the optical systems since those materials are lighter in the weight and lower in the cost when compared with glass. However, the plastic is inferior to the glass in the stability in the refractive index against changes in temperature and humidity. Therefore, improvement is desired in this point of view for the plastic materials.

The refractive index of an organic polymer decreases with increasing temperature almost without exception (temperature dependency of the refractive index: dn/dT<0). As described below, for example, dn/dT of organic polymer materials (thermoplastic resins) to be applied for the optical use is generally almost $-10^{-4}$/K.

A method for reducing the absolute value of dn/dT has been proposed, in which a substance having a dn/dT of more than 0 is mixed in the thermoplastic resin host material which has a dn/dT of less than 0. Among inorganic substances, known are the ones showing a dn/dT of more than 0, which is a result of the variation in the intramolecular coordination with varing temperature. It has been expected that the absolute value of dn/dT is reduced by mixing an organic polymer thermoplastic resin of which a dn/dT is less than 0 with inorganic particles having a dn/dT of more than 0. Accordingly, an optical product reduced in thermal sensitivity of an optical property, containing a thermal sensitive thermoplastic polymer resin and particles dispersed therein has been proposed in Patent Documents 2 through 8, for example.

Various proposals have been submitted regarding the composite materials each containing inorganic particles. Composite materials containing particles of a semi-conductive substance and a resin composition in which semi-conductive particles are bonded with the polymer chain by a covalent bond are disclosed, for example, in Patent Document 9, and a resin composition containing zinc sulfide particles is disclosed, for example, in Patent Document 10.

Patent Document 6, for example, describes that the mixing of 40% by weight or more of aluminum oxide or magnesium oxide is necessary to reduce by 50% of the dn/dT of the thermoplastic resin.

However, when a composite material contains inorganic particles having high refractive index in such the high ratio, the following problems may occur, for example, (i) transparency of the composite material largely decreases; and (ii) the property of the composite material varies during prolonged storage due to coagulation of the inorganic particles dispersed in the resin. Accordingly, composite materials suitable for practical use as an optical element have hardly been obtained.

In the methods disclosed in Patent Documents 9 and 10, particles having high refractive index, namely semi-conductive particles are added to increase the refractive index of the resin composition. However, a sufficiently high transparency as an optical element cannot be obtained in the resin composition obtained by such a method. These Patent Documents do not describe the use of two or more kinds of particles having different refractive indexes such as that described in the present invention, and no composite material having high transparency and small temperature dependency in the refractive index as obtained in the present invention has been known until now.

Non-patent Document 1: C. Becker, P. Mueller and H. Schmidt, "Optical and thermomechanical investigations on thermoplastic nanocomposites with surface-modified silica nanoparticles", SPIE Proceedings, July 1998, vol. 3469, p.p. 88-98

Non-patent Document 2: B. Braune, P. Mueller and H. Schmidt, "Tantalum oxide nanomers for optical applications", SPIE Proceedings, July 1998, vol. 3469, p.p. 124-132

Patent Document 1: Japanese Patent Publication Open to Public Inspection (hereafter referred to as JP-A) No. 2002-105131, (p. 4)

Patent Document 2: JP-A No. 2002-207101, (Claims)
Patent Document 3: JP-A No. 2003-240901, (Claims)
Patent Document 4: JP-A No. 2002-241560, (Claims)
Patent Document 5: JP-A No. 2002-241569, (Claims)

Patent Document 6: JP-A No. 2002-241592, (Claims)
Patent Document 7: JP-A No. 2002-241612, (Claims)
Patent Document 8: JP-A No. 2002-303701, (Claims)
Patent Document 9: JP-A No. 2002-105325, (Claims)
Patent Document 10: JP-A No. 2003-73563, (Claims)

SUMMARY OF THE INVENTION

An object of the present invention is to provide a thermoplastic composite material having considerably small thermal variation in the refractive index and an optical element employing the composite material.

One of the aspects of the present invention to attain the above object is a thermoplastic composite material containing: (i) a thermoplastic resin containing an organic polymer; and (ii) particles having an average diameter of 1-30 nm dispersed in the thermoplastic resin, wherein the particles contain two or more kinds of inorganic particles having different refractive indexes.

DESCRIPTION OF THE PREFERRED EMBODIMENTS

Figure 1:
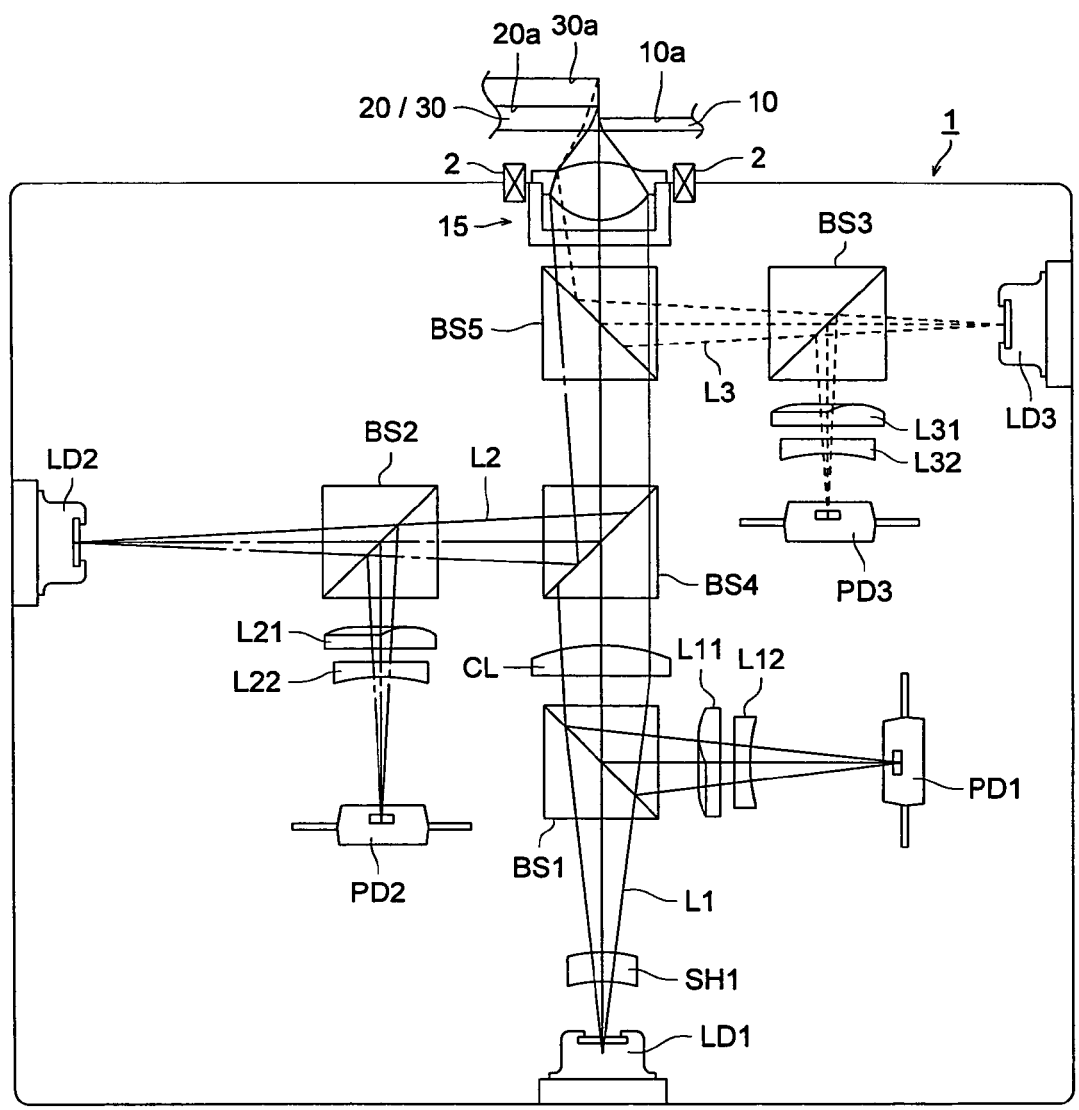
FIG. 1 shows a schematic drawing of constitution of optical pickup apparatus 1.

The above object of the present invention is achieved by the following structures.

(1) A thermoplastic composite material containing:

(i) a thermoplastic resin containing an organic polymer; and (ii) particles having an average diameter of 1-30 nm dispersed in the thermoplastic resin, wherein the particles contain two or more kinds of inorganic particles having different refractive indexes.

(2) The thermoplastic composite material of Item (1), wherein nh and np1 satisfy Formula (A), provided that nh represents a refractive index of the thermoplastic resin and np1 represents a smallest refractive index among refractive indexes of the two or more kinds of inorganic particles.

$$nh-0.1 \leq np1 \leq nh+0.1 \qquad \text{Formula (A)}$$

(3) The thermoplastic composite material of Item (2), wherein np1 and np2 satisfy Formula (B), provided that np2 represents one of the refractive indexes of the two more kinds of inorganic particles other than np1.

$$0.1 \leq np2-np1 \leq 1.0 \qquad \text{Formula (B)}$$

(4) The thermoplastic composite material of Item (3), wherein a weight content of inorganic particles having the refractive index of np1 is not less than a content of inorganic particles having the refractive index of np2.

(5) The thermoplastic composite material of Item (3), wherein a weight content of inorganic particles having the refractive index of np1 is not more than a content of inorganic particles having the refractive index of np2.

(6) The thermoplastic composite material of any one of Items (1) to (5), wherein a total content of the two or more kinds of inorganic particles is in the range of 20-70% by weight based on a weight of the thermoplastic resin.

(7) An optical element formed by using the thermoplastic composite material of any one of Items (1) to (6).

A thermoplastic composite material having considerably small temperature dependence of the refractive index can be obtained by the present invention, and further an optical element having small temperature dependence of the refractive index and high light transmittance which is not degraded during storage for a prolonged period can be obtained by employing the thermoplastic composite material of the present invention.

Preferred embodiments of the present invention are described below. Though various technical limitations preferable for carrying out the present invention are described in the followings, the present invention is not limited thereto.

An optical element exhibiting small temperature dependence of the refractive index and high transparency which is not degraded during storage for a prolonged period can be realized by a thermoplastic composite material containing a thermoplastic organic polymer resin as a host material and particles having an average diameter of 1-30 nm dispersed in the thermoplastic organic polymer resin, wherein (i) the particles contain two or more kinds of inorganic particles having different refractive indexes; and (ii) nh and np1 satisfy Formula (A), provided that nh represents a refractive index of the thermoplastic organic polymer resin and np1 represents a refractive index of one of the two or more kinds of inorganic particles.

$$nh-0.1 \leq np1 \leq nh+0.1 \qquad \text{Formula (A)}$$

The above mentioned effects of the present invention are further enhanced when the thermoplastic composite material containing particles having an average diameter of 1-30 nm dispersed in the thermoplastic organic polymer resin satisfy one of the following conditions (1) to (4):

(1) np1 and np2 satisfy Formula (B), wherein np1 and np2 represent refractive indexes of two kinds of inorganic particles and np2 is larger than np1;

$$0.1 \leq np2-np1 \leq 1.0 \qquad \text{Formula (B)}$$

(2) The content of inorganic particles having the refractive index of np1 is not less than the content of inorganic particles having the refractive index of np2;

(3) The content of the inorganic particle having the refractive index of np1 is not more than the content of the inorganic particle having the refractive index of np2; and (4) The total content of the two or more kinds of inorganic particles is in the range of 20-70% by weight based on a weight of the thermoplastic organic polymer resin.

The embodiments of the present invention will now be described in detail below.

<<Inorganic Particle>>

The average diameter of the inorganic particles is preferably from 1 nm to 30 nm, more preferably 1 nm to 20 nm, and further preferably from 1 nm to 10 nm. When the average diameter is less than 1 nm, there is the possibility that the desired property cannot be obtained because the particles are difficultly dispersed. When the average diameter exceeds 30 nm, there is the possibility that the luminous transmittance (hereafter referred to as transmittance) becomes less than 70% by the lowering in the transparency due to the turbid of the thermoplastic material composition. The average particle diameter is the value in the terms of the diameter of the sphere having the same volume.

Though the shape of the inorganic particle is not specifically limited, a spherical particle is preferably employed. The distribution of the particles is also not limited but ones having relatively narrow distribution are preferable than ones having relatively wide distribution for enhancing the effects of the present invention.

The dn/dT of the inorganic particle is preferably not less than 0, more preferably from 0 to 0.01, and specifically preferably from $5 \times 10^{-5}$ to $5 \times 10^{-3}$.

As inorganic particles, oxide particles are employable, for example. In concrete, examples of the oxide include: silicon oxide, titanium oxide, zinc oxide, aluminum oxide, zirconium oxide, hafnium oxide, niobium oxide, tantalum oxide, magnesium oxide, calcium oxide, strontium oxide, barium oxide, yttrium oxide, lanthanum oxide, cerium oxide, indium oxide, tin oxide, lead oxide, and a double oxide composed of these oxides such as lithium niobate, potassium niobate and lithium tantalate. Phosphates, carbonates and sulfates formed by the combination of these oxides such as aluminum phosphate, tantalum phosphate, magnesium carbonate, calcium carbonate, strontium carbonate, zinc sulfate and copper sulfate are also preferably employed.

As inorganic particles, particles of a semi-conductor crystal are also preferably utilized. Though the composition of the semi-conductor crystal is not specifically limited, desirable are those exhibiting no absorption, no light emission and no fluorescence within the range of the wavelength of light applying to the optical element. Examples of the composition include: elements of Group 14 of periodic table such as carbon, silicon, germanium and tin; elements of Group 15 of periodic table such as phosphorus (black phosphorous); elements of Group 16 of periodic table such as selenium and tellurium; compounds composed of elements of Group 14 of periodic table such as silicon carbide SiC; compounds composed of an element of Group 14 and that of Group 16 of periodic table such as tin oxide(IV) $SnO_2$, tin sulfide(II, IV) $Sn(II)Sn(IV)S_3$, tin sulfide (IV) $SnS_2$, tin(II) selenide SnSe, tin(II) telluride SnTe, lead(II) sulfide PbS, lead(II) selenide PbSe and lead(II) telluride PbTe; compounds of an element of Group 13 and that of Group 15 of periodic table (or semi-conductor compounds of Group III-V) such as boron nitride BN, boron phosphide BP, boron arsenide BAs, aluminum nitride AlN, aluminum phosphide AlP, aluminum arsenide AlAs, aluminum antimonide AlSb, gallium nitride GaN, gallium phosphide GaP, gallium arsenide GaAs, gallium antimonide GaSb, indium nitride InN, indium phosphide InP, indium arsenide InAs and indium antimonide InSb; compounds of an element of Group 13 and that of Group 16 of periodic table such as aluminum sulfide $Al_2S_3$, aluminum selenide $Al_2Se_3$, gallium sulfide $Ga_2S_3$, gallium selenide $Ga_2Se_3$, gallium telluride $Ga_2Te_3$, indium oxide $In_2O_3$, indium sulfide $In_2S_3$, indium selenide $In_2Se_3$ and indium telluride $In_2Te_3$; compounds of an element of Group 13 and that of Group 17 of periodic table such as thallium(I) chloride TlCl, thallium(I) bromide TlBr and thallium(I) iodide TlI; compounds of an element of Group 12 and that of Group 16 of periodic table (or semiconductor compounds of Group II to VI) such as zinc oxide ZnO, zinc sulfide ZnS, zinc selenide ZnSe, zinc telluride ZnTe, cadmium oxide CdO, cadmium sulfide CdS, cadmium selenide CdSe, cadmium telluride CdTe, mercury sulfide HgS, mercury selenide HgSe and mercury telluride; compounds of an element of Group 15 and that of Group 16 of periodic table such as arsenic(III) sulfide $As_2S_3$, arsenic(III) selenide $As_2Se_3$, arsenic(III) telluride $As_2Te_3$, antimony(III) sulfide $Sb_2S_3$, antimony selenide $Sb_2Se_3$, antimony(III) telluride $Sb_2Te_3$, bismuth(III) sulfide $Bi_2S_3$, bismuth(III) selenide $Bi_2Se_3$ and bismuth(III) telluride $Bi_2Te_3$; compounds of an element of Group 11 and that of Group 16 of periodic table such as copper(I) oxide $Cu_2O$ and copper(I) selenide $Cu_2Se$; compounds of an element of Group 11 and that of Group 17 of periodic table such as copper(I) chloride, copper(I) bromide CuBr, copper(I) iodide CuI, silver chloride AgCl and silver bromide AgBr; compounds of an element of Group 10 and that of Group 16 of periodic table such as nickel(II) oxide NiO; compounds of an element of Group 9 and that of Group 16 of periodic table such as cobalt(II) oxide CoO and cobalt(II) sulfide CoS; compounds of an element of Group 8 and that of Group 16 of periodic table such as iron(II) diiron(III) oxide $Fe_3O_4$ and iron(II) sulfide FeS; compounds of an element of Group 7 and that of Group 16. of periodic table such as manganese(II) oxide; compounds of an element of Group 6 and that of Group 16 of periodic table such as molybdenum(IV) sulfide $MoS_2$ and tungsten(IV) oxide. $WO_2$; compounds of an element of Group 5 and that of Group 16 of periodic table such as vanadium(II) oxide VO, vanadium(IV) oxide $VO_2$ and tantalum(V) oxide $Ta_2O_5$; compounds of an element of Group 4 and that of Group 16 of periodic table such as titanium oxide $TiO_2$ $Ti_2O_5$, $Ti_2O_3$ and $Ti_5O_9$; compounds of an element of Group 2 and that of Group 16 of periodic table such as magnesium sulfide MgS and magnesium selenide MgSe; charcogen spinel such as cadmium(II) chromium(III) oxide $CdCr_2O_4$, cadmium(II) chromium(III) selenide $CdCr_2Se_4$ and mercury(II) chromium(III) selenide $HgCr_2Se_4$; and barium titanate $BaTiO_3$. Furthermore, a semi-conductor cluster having a confirmed structure such as $(BN)_{75}(BF_2)_{15}F_{15}$ described in G. Schmid et al., Adv. Mater., vol 4, p. 494, 1991 and $Cu_{146}Se_{73}$(triethylphosphine)$_{22}$ described in D. Fenske et al., CHEM. Int. Ed. Engl., vol. 29, P. 1452, 1990 is also exemplified.

Among them, two or more kinds of the inorganic particles having different refractive indexes are employed in the present invention. The refractive index is an average value of the refractive indexes nd25 measured by using d-line of light at 25° C. Regarding the compound showing anisotropic refractive index such as calcium carbonate, the refractive index is an average of the refractive index values of normal light and that of extraodinary light. The refractive index nd25 corresponds to the refractive index measured by Abbe refractmeter according to ASTM Test Method D542, and valued described in various documents can be applied.

The refractive index np1 of the first inorganic particles are preferably near that of the thermoplastic resin, and preferably employed are inorganic particles having a refractive index of which difference with the refractive index of the thermoplastic resin is not more than 0.1 as shown in Formula (A). The refractive index of the inorganic particle is preferably from 1.4 to 2.0, and more preferably from 1.45 to 1.7 even though it may be varied depending on the composition of the thermoplastic resin. In concrete, silicon dioxide, calcium carbonate, magnesium carbonate, strontium carbonate and aluminum phosphate are preferably employed.

The refractive index of the second inorganic particles are preferably higher than that of the thermoplastic resin, and preferable are inorganic particles having a refractive index of not less than the refractive index of the thermoplastic resin, but not more than 4.0. The refractive index of the second inorganic particle is preferably higher than that of the first inorganic particle. The refractive index of the second inorganic particle is preferably from 1.6 to 4.0, and more preferably from 1.7 to 3.0 even though the refractive index may be varied depending on the composition of the thermoplastic resin. In concrete, aluminum oxide, zinc oxide, zinc sulfide, titanium oxide, magnesium oxide, niobium oxide and lithium niobate are preferably employed.

The difference between the refractive index of the first inorganic particles and that of the second inorganic particles is preferably from 0.1 to 1.0 as shown in Formula (B). Three or more kinds of the inorganic particle may be employed by selecting from the above-described two kinds and another kind of the inorganic particles.

<<Production Method and Surface Modification of Inorganic Particle>>

Any known methods can be applied for producing the inorganic particles without any limitation. For example, desired oxide particles can be produced by hydrolyzing a metal halide or a metal alkoxide as a raw material in a reaction system containing water. On such the occasion, an organic acid or an organic amine may be employed for stabilizing the inorganic particles. In concrete, the known method described in "Journal of Chemical Engineering of Japan" vol. 31, No. 1, P.P. 21-28, 1998, can be applied for titanium dioxide particles and that described in "Journal of Physical Chemistry" vol. 100, P.P. 468-471, 1996 can be applied for zinc sulfide. According to the methods, for example, titanium oxide particles having an average diameter of 5 nm can be easily produced by hydrolyzing titanium tetraisopropoxide or titanium tetrachloride as the raw material in a suitable solvent in the presence of a suitable surface modifier agent. Zinc sulfide having an average particles diameter of 40 nm can be produced by sulfurization of dimethyl zinc or zinc chloride as the raw material by using hydrogen sulfide or sodium sulfide in the presence of the surface modifier agent.

A method for forming oxide particles having a diameter of from 5 to 100 nm is disclosed in JP-A No. 60-255602, in which a metal powder of a suitable amount for forming dust cloud is thrown into a chemical flame and burned in an oxygen containing atmosphere which is frequently employed for forming oxide particles.

Besides the above mentioned methods for forming inorganic nanoparticles using clusters which are referred to as bottom up processes, a top down process has been proposed in which inorganic particles are further pulverized to form nonaparticles. Concrete examples of a pulverizer include: Ultra-Apex Mill manufactured by Kotobuki Engineering & Manufacturing Co., Ltd.; Counter Jet Mill, Micronjet and Inomizer, each manufactured by Hosokawa Micron Corp.; IDS Mill and PJM Jet Crusher manufactured by Nippon Pneumatic Mfg. Co., Ltd.; Cross Jet Mill manufactured by Kurimoto Ltd.; Ulmax manufactured by Nisso Engineering Co., Ltd.; SK Jet-o-Mill manufactured by Seishin Enterprise Co., Ltd.; Kryptron manufactured by Kawasaki Heavy Industries, Ltd.; Turbo Mill manufactured by Turbo Kogyo Co., Ltd.; and Super Rotor manufactured by Nisshin Engineering Inc.

Any known method can be applied for the surface modification without any limitation. For example, a method can be applied in which the surface of each particle is modified by hydrolysis of the modifier agent in the presence of water. In such the method, an acid or an alkali is suitably applied as a catalyst. It is generally considered that a hydroxyl group at the surface of the particle and a hydroxyl group formed by hydrolysis of the modifier agent are combined to form a bond by dehydration.

The inorganic particles relating to the present invention is preferably subjected to the surface treatment.

Examples of the surface modifier agent to be used for the surface treatment include: tetramethoxysilane, tetraethoxysilane, tetraisopropoxysilane, tetrephenoxysilane, methyltrimethoxysilane, ethyltrimethoxysilane, propyltrimethoxysilane, methyltriethoxysilane, methyltriphenoxysilane, ethyltriethoxysilane, phenyltrimethoxysilane, 3-methylphenyltrimethoxysilane, dimethyldimethoxysilae, diethyldiethoxysilane, diphenyldimethoxysilane, diphenyldiphenoxysilane, trimethylmethoxysilane, triethylethoxysilane, triphenylmethoxysilane and triphenylphenoxysilane.

These compounds are each different from the others in the properties such as reaction rate, and the compound suitable for the condition of surface modification can be selected to be used. The compounds may be employed singly or in combination of two or more kinds thereof. The properties of the surface of the surface modified particle is varied sometimes depending on the compound employed for the surface modification, and the affinity with the thermoplastic resin to be employed for formation of the material composition can be increased by the selection of the compound employed for the surface modification. Though the ratio of the surface modification is not specifically limited, the ratio of the surface decoration is preferably from 10 to 99% by weight, and more preferably from 30 to 98% by weight.

<<Mixing of Resin and Inorganic Particles>>

The thermoplastic composite material contains the thermoplastic resin as the host material and the inorganic particles, and the production method thereof is not specifically limited. Examples of the applicable method include a method in which the thermoplastic resin and the inorganic particles which are each independently prepared are mixed thereafter, a method in which the thermoplastic resin is produced in the presence of the preliminary prepared inorganic particles, a method in which the inorganic particles are formed in the presence of the preliminary prepared thermoplastic resin, and a method in which the thermoplastic resin and the inorganic particles are simultaneously formed. In concrete, for example, a method is suitably applied in which a solution of the thermoplastic resin and a uniform dispersion of the inorganic particles are uniformly mixed and the resultant mixture is poured into a solvent having low dissolvability to the thermoplastic resin, but the method is not limited to this method.

Though the degree of mixing of the thermoplastic resin and the inorganic particles is not specifically limited in the present invention, it is preferable that they are uniformly mixed for enhancing the effects of the present invention. When the mixing degree is insufficient, the optical properties such as refractive index, Abbe constant and the light transparency may be degraded and the processing suitability of the resin such as thermoplastic ability and the melting forming ability is also degraded. It is supposed that the mixing degree is influenced by the producing method. Therefore, it is important that the method is selected sufficiently considering the properties of the thermoplastic resin and those of the inorganic particle. For further uniformly mixing the thermoplastic resin and the inorganic particles, a method by directly bonding the thermoplastic resin and the inorganic particle can be suitably applied in the present invention.

The content of the inorganic particles is not limited as long as the content is within the range in which the effect of the present invention can be obtained, and can be optionally decided according to the kind of the thermoplastic resin and the kind of the inorganic particles. The total content of the inorganic particles is preferably from 20% to 70%, more preferably from 30% to 60%, and further preferably from 30% to 50%, based on the weight of the thermoplastic resin. The content of the inorganic particles can be determined by the observation by a transmission electron microscope (TEM) (information regarding the composition of the particle can be also obtained by local element analysis by EDX), and can be calculated from the containing weight of the designated particle component determined by the elemental analysis of the ash contained in the resin composition and the specific gravity of the crystal of the particle component.

In the case of the thermoplastic composite material containing two or more kinds of the inorganic particles, the content of each kind of the inorganic particles also can be optionally decided. For example, when the inorganic particles having the refractive index $np1$ near that of the thermoplastic resin and the inorganic particles having higher refractive index $np2$ are dispersed in the thermoplastic resin, the content of the inorganic particles having the refractive index of $np1$ may be higher or may be lower than that of the inorganic particles having the refractive index of $np2$. The contents of the both kinds of the inorganic particles can be controlled according to the purpose of the composite material. For obtaining a composite material having a high refractive index, the content of the inorganic particles having the refractive index of $np1$ is preferably lower than that of the inorganic particles having the refractive index of $np2$. For obtaining a composite material having a high light transparency, the content of the inorganic particles having the refractive index of $np1$ is preferably higher than that of the inorganic particle having the refractive index of $np2$.

High content of inorganic particles having a high refractive index is not preferable since the optical properties such as the light transparency are degraded due to scattering of light. Consequently, the content of the inorganic particles having a refractive index higher by 0.5 or more than that of the thermoplastic resin is preferably from 1 to 40%, and more preferably from 5 to 30%, based on the weight of the thermoplastic resin.

<<Thermoplastic Resin Containing Organic Polymer>>

The thermoplastic resin containing an organic polymer according to the present invention is described below.

Though transparent thermoplastic composite materials are usually employed for optical material can be employed as the organic polymer host material without any limitation, an acryl resin, a cyclic olefin resin, a polycarbonate resin, a polyester resin, a polyether resin, a polyamide resin and a polyimide resin are preferable considering the processing suitability of the resin as the optical element. The compounds described in JP-A No. 2003-73559 can be exemplified. Preferable compounds are listed in Table 1.

TABLE 1

| Chemical formula | Structure | Refractive index n | Abbe constant ν |
|---|---|---|---|
| (1) | 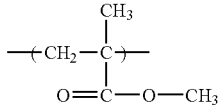 | 1.49 | 58 |
| (2) | 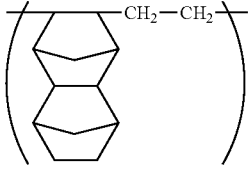 | 1.54 | 56 |
| (3) | 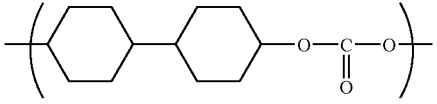 | 1.53 | 57 |
| (4) | 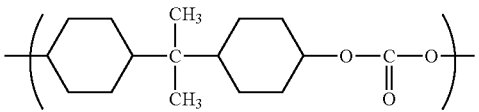 | 1.51 | 58 |
| (5) | 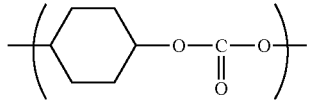 | 1.52 | 57 |
| (6) | 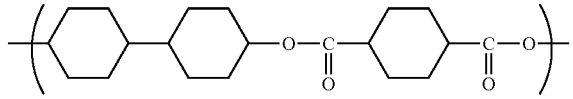 | 1.54 | 55 |

TABLE 1-continued

| Chemical formula | Structure | Refractive index n | Abbe constant ν |
|---|---|---|---|
| (7) | [structure] | 1.53 | 57 |
| (8) | [structure] | 1.55 | 57 |
| (9) | [structure] | 1.54 | 57 |
| (10) | [structure] | 1.55 | 58 |
| (11) | [structure] | 1.55 | 53 |
| (12) | [structure] | 1.54 | 55 |
| (13) | [structure] | 1.54 | 56 |
| (14) | [structure] | 1.58 | 43 |

In the composite material, the thermoplastic resin containing an organic polymer is preferably the compounds described in JP-A No. 7-145213, paragraphs [0032] to [0054] which are olefin copolymers having a cyclic structure obtained by hydrogenation to an copolymer of an α-olefin having 2 to 20 carbon atoms and a cyclic olefin, or alicyclic hydrocarbon copolymers constituted by a repeating unit having a cyclic structure. Examples of the cyclic olefin resin preferably employable include Zeon (Nihon Zeon Co., Ltd.), Apel (Mitsui Kagaku Co., Ltd.), Arton (JSR Co., Ltd.) and Topas (Chikona Co., Ltd.), but the resin is not limited thereto.

<<Other Additives>>

Various kinds of additives can be combined according to necessity on the occasion of preparation of the composite material of the present invention or the forming process of the resin composition. Examples of the additive include a stabilizing agent such as an antioxidant, a thermal stabilizer, a light proofing stabilizer, a weather proofing stabilizer, a UV absorbent and an infrared absorbent; a resin improving agent such as a slipping agent and a plasticizer; a turbid preventing agent such as a soft polymer and an alcoholic compound; a colorant such as a dye and a pigment; and a anti-static agent, a flame retardant and a filler, though the additive is not specifically limited. These additives may be employed singly or in combination. The adding amount of the additive is suitably decided within the range in which the foregoing effects of the present invention are not disturbed. In the present invention, it is preferable that the polymer contains at least the plasticizer and the antioxidant.

<Plasticizer>

Though the plasticizer is not specifically limited, a phosphate plasticizer, a phthalate plasticizer, a trimellitate plasticizer, a pyromellitate plasticizer, a glycolate plasticizer, a citrate plasticizer and a polyester plasticizer can be exemplified.

Examples of the phosphate plasticizer include triphenyl phosphate, tricresyl phosphate, cresyl phenyl phosphate, octyl diphenyl phosphate and tributyl phosphate; those of the phthalate plasticizer include diethyl phthalate, dimethoxyethyl phthalate, dimethyl phthalate, dioctyl phthalate, dibutyl phthalate, di-2-ethylhexyl phthalate, butyl benzyl phthalate, diphenyl phthalate and dicyclohexyl phthalate; those of the trimellitate plasticizer include tributyl trimellitate, triphenyl trimellitate and triethyl trimellitate; those of pyromellitate include tetrabutyl pyromellitate, tetraphenyl pyromellitate and tetraethyl pyromellitate; those of glycolate plasticizer include triacetine, tributyline, ethyl phthalyl ethyl glycolate, methyl phthalyl ethyl glycolate and butyl phthalyl butyl glycolate; and those of the citrate plasticizer include triethyl citrate, tri-n-butyl citrate, acetyltriethyl citrate, acetyltri-n-butyl citrate and acetyltri-n-(2-ethylhexyl) citrate.

<Antioxidant>

As the antioxidant, a phenol antioxidant, a phosphorus antioxidant and a sulfur antioxidant are usable and the phenol antioxidant, particularly an alkyl-substituted phenol antioxidant, is preferable. BY the addition of such the antioxidants, coloring and strength lowering of the lens caused oxidation on the occasion of the lens formation can be prevented without lowering in the transparency and the resistivity against heat. These antioxidants may be employed singly or in combination of two or more of them. Though the adding amount of the antioxidant may be optionally decided within the range in which the effects of the present invention are not disturbed, the amount is preferably 0.001 to 5, and more preferably from 0.01 to 1, parts by weight to 100 parts by weight of the polymer relating to the present invention.

Known phenol antioxidants can be employed. Examples of the phenol antioxidant include acrylate compounds described in Nos. 63-179953 and 1-168643 such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl) ethyl)phenyl acrylate; alkyl-substituted phenol compounds such as octadecyl-3-(3,5-di-t-butyl-4-hydroxyphenyl propionate, 2,2'-methylene-bis(4-methyl-6-t-butylphenyl), 1,1,3-tris(2-methyl-4-hydroxy-5-t-butylphenyl)butane, 1,3,5-trimethyl-2,4,6-tris(3,5-di-t-butyl-4-hydroxybenzyl)benzene, tetrakis(methylene-3-(3',5'-di-t-butyl-4'-hydroxyphenyl propionate)methane namely pentaerythrimethyl-tetrakis(3-(3,5-di-t-butyl-4-hydroxyphenyl propionate)) and triethylene glycol-bis(3-(3-t-butyl-4-hydroxy-5-methylphenyl)propionate; and triazine group-containing phenol compounds such as 6-(4-hydroxy-3,5-di-t-butylanilino)-2,4-bisoctylthio-1,3,5-triazine, 4-bisoctylthio-1,3,5-triazine and 2-octylthio-4,6-bis(3,5-di-t-butyl-4-oxyanilino)-1,3,5-triazine.

The phosphorus antioxidants usually employed in the resin industry are usable without any limitation. Examples of the phosphorus antioxidant include monophosphites such as triphenyl phosphite, diphenyl isodecyl phosphite, phenyl diisodecyl phosphite, tris(nonylphenyl)phosphite, tris(dinonylphenyl)phosphite, tris(2,4-di-t-butylphenyl)phosphite and 10-(3,5-di-t-butyl-4-hydroxybenzyl)-9,10-dihydro-oxa-1-phosphaphenathlene-10-oxide; and diphosphites such as 4,4'-butylidene-bis(3-methyl-6-t-butylphenyl-di-tridecyl phosphite) and 4,4'-isopropylidene-bis(phenyl-di-alkyl (C12-C15)phosphite. Among them the monophosphites particularly tris(nonylphenyl)phosphite, tris(dinonyl-phenyl) phosphite and tris(2,4-di-t-butylphenyl)phosphite, are preferable.

Examples of the sulfur antioxidant include dilauryl 3,3-thiodipropionate, dimiristyl 3,3-thiodipropionate, distearyl 3,3-thiodipropionate, lauryl stearyl 3,3-thiodipropionate, penterythritol-tetrakis(β-lauryl-thio-propionate) and 3,9-bis(dodecylthioethyl)-2,4,8,10-tetraoxaspiro[5,5]undecane.

<Light Stabilizer>

As a light stabilizer which provides lightfastness to the thermoplastic composite material, a benzophenone light stabilizer, a benzotriazole light stabilizer and a hindered amine light stabilizer are cited. In the present invention the hindered amine light stabilizers are preferably employed from the viewpoint of the transparency and the anti-coloring ability of the lens. Among the hindered amine light stabilizer, hereinafter referred to as HALS, ones having a Mn measured by GOC using tetrahydrofuran (THF) and converted into polystyrene of from 1,000 to 10,000, particularly from 2,000 to 5,000, and especially from 2,800 to 3,800, are preferable. When the Mn is too small, the designated amount of the HALS is difficultly added by the reason of evaporation thereof on the occasion of the addition of the HALS into the block-copolymer by heating, meting and kneading, or the processing suitability of the composite material is lowered so that a bubble and a silver streak are formed on the occasion of the forming by heating and melting. Furthermore, the volatile ingredient is formed in a gas state when the lens is used for long time while the light source lamp lights. When the Mn is too large, the dispersibility of the HALS in the block copolymer is lowered so that the transparency of the lens is decreased and the improving effect on the light stabilization is lowered. In the present invention, therefore, the lens superior in the processing stability, low gas formation and transparency can be obtained by making the Mn of the HALS into the above range.

Concrete examples of the HALS include a high molecular weight HALS composed by combining plural piperidine rings through triazine skeletons such as a polycondensation product of N,N',N'',N'''-tetrakis-[4.6-bis-{butyl-(N-methyl-2,2,6,6-tetramethylpiperidine-4-yl)amino}-triazine-2-yl]-4, 7-diazadecane-1,10-diamine, dibutylamine 1,3,5-triazine and N,N'-bis(2,2,6,6-teramethyl-4-piperidyl)butylamine, a polycondensation product of poly[{(1,1,3,3-tetramethylbutyl)amino-1,3,5-triazine-2,4-di-yl} {(2,2,6,6-tetramethyl-4-piperidyl)imino}hexamethylene{(2,2,6,6-tetramethyl-4-pipridyl)imino}], 1,6-hexanediamine-N,N'-bis(2,2,6,6-tetramethyl-4-piperidyl) and morpholine-2,4,6-trichloro-1,3, 5-triazine, and poly[(6-morpholino-s-triazine-2,4-di-yl)(2,2, 6,6-tetramethyl-4-piperidyl)imino]-hexamethylene-(2,2,6, 6-tetramethyl-4-piperidyl)imino]; and a high molecular weight composed by combining piperidine rings through ester bonds such as a polymer of dimethyl succinate and 4-hydroxy(2,2,6,6-tetramethyl-1-piperidineethanol, a mixed ester of 1,2,3,4-butenetetracarboxylic acid, 1,2,2,6,6-pentamethyl-4-piperidinol and 3,9-bis(2-hydroxy-1,1-dimethylethyl)-2,4,8,10-tetraoxaspiro[5,5]undecane. Among them, ones having a Mn of from 2,000 to 5,000 such as the polycondensation product of dibutylamine 1,3,5-triazine and N,N'-bis(2,2,6,6-teramethyl-4-piperidyl)butylamine, poly [(6-morpholino-s-triazine-2,4-di-yl)(2,2,6,6-tetramethyl-4-piperidyl)imino]-hexamethylene-(2,2,6,6-tetramethyl-4-piperidyl)imino] and the polymer of dimethyl succinate and 4-hydroxy(2,2,6,6-tetramethyl-1-piperidineethanol are preferable.

The adding amount of the above-compounds to the composite material of the present invention is preferably from 0.01 to 20, more preferably from 0.02 to 15, and particularly preferably from 0.05 to 10, by weight to 100 parts by weight of the polymer. When the adding amount is too small, the satisfactory improving effect in the light resistivity can not be obtained so that the coloring of the lens is caused during use for log period at out of door. When the adding amount of the HALS is excessively large, a part of it causes gas and the dispersing ability in the resin is lowered so that the transparency of the lens is decreased.

Occurrence of white turbid of the lens during for long period under high temperature and high humid condition can be prevented without degradation in the transparency, heat resistivity and mechanical strength by the addition of a compound having the lowest glass transition point of not more than 30° C. to the composite material of the present invention.

<<Properties of the Thermoplastic Composite Material>>

The thermoplastic composite material comprising the thermoplastic resin and the two or more kinds of inorganic particle different in the refractive index from each other dispersed in the resin is characterized in that the thermal variation rate of the refractive index dn/dT is small.

The dn/dT which is an indicator the thermal variation rate of the refractive index indicates that the refractive index n is varied in the rate of dn/dT with respect to the temperature T. The value of dn/dT can be determined by measuring the refractive index of the composite material at every temperature. The method for measuring the refractive index can be chosen for suiting to the state of the thermoplastic composite material from an ellipsometric method, a spectral reflectance method, a light conductive path method, an Abbe method and a minimum angle deviation method, for example.

In the thermoplastic composite material according to the present invention, the absolute value $|dn/dT|$ of the dn/dT is preferably from 0 to $9.0 \times 10^{-5}$, and more preferably from 0 to $5.0 \times 10^{-5}$. Though the dn/dT is preferably in the above range in the entire wavelength region, an optical element superior in the thermal stability to the usual elements can be provided when the dn/dT is within the above range at the wavelength region used to the optical element.

The thermoplastic composite material of the present invention is preferably transparent with respect to the wavelength of visual region. The transmittance of the thermoplastic composite material of the present invention is usually not less than 50%, preferably not less than 60%, more preferably not less than 70%, and most preferably not less than 85%, in a light path length of 3 mm. The measurement of the transmittance is carried out according to the standard of ASTM D-1003 (thickness of 3 mm). The above visible region means the wavelength region of from 400 to 650 nm.

The refractive index of the thermoplastic composite material of the present invention is preferably within the range of from 1.5 to 2.7, more preferably from 1.6 to 2.4, and most preferably from 1.7 to 2.3, though the refractive index can be controlled according to the purpose of the use.

The thermoplastic material of the present invention is a material composition superior in the optical properties having low temperature independency of the refractive index and high transparency. Furthermore, the material is excellent in the in the suitability for the shape forming processing since it has thermal plasticity and/or suitability for injection forming. Such the material excellent in both of the optical properties and the suitability for shape forming process cannot be attained by the previously disclosed materials, and it is supposed that the composition comprising the specified resin and the specified inorganic particles contributes to such the properties of the material.

<<Production Method of Optical Element or Optical Resin Lens>>

The production method of the optical resin lens, one of the optical elements of the present invention, is described below.

The production method of optical resin lens includes a process for preparing a resin composition, which may be a composition containing a resin alone or a mixture of the resin and an additive, and a process for shape forming the resultant resin composition.

The shape formed product of the thermoplastic composite material is obtained by shape forming the foregoing resin composition. A melt-molding method is preferable for obtaining the formed product superior in the low birefringence, mechanical strength and dimension accuracy. For melt-molding, a press molding apparatus, an extrusion molding apparatus and an injection molding apparatus, each available on the market, are applicable and the injection molding method is preferable from the viewpoint of the molding property and the production efficiency.

Though the molding condition is optionally decided according to the purpose of the use and the molding method, the temperature of the resin composition (one containing only a resin or a mixture of the resin and the additive) is, for example, preferably from 150° C. to 400° C., more preferably from 200° C. to 350° C., and particularly preferably from 200° C. to 330° C. from the viewpoint for preventing occurrence of the sink and the distortion of the molded product by giving the suitable fluidity on the occasion of the molding and further preventing the occurrence of the silver streak caused by the thermal decomposition and yellow coloring of the molded product.

The molded product according to the present invention can be employed in various shapes such as sphere, rod, plate, column, cylinder, tube, fiber, film and sheet. Though the molded product is employed for the optical resin lens, which is one of the optical elements according to the present invention, since it is superior in the low birefringence, transparency, mechanical strength, heat resistivity and low water absorbability, it is suitable for other optical parts.

<<Optical Element>>

The optical element according to the present invention is produced by the foregoing method, and concrete examples of the application of the element are as follows.

The optical element is applicable for, for example, an optical lens and an optical prism such as a lens system of a camera; a lens for a microscope, an endoscope and a telescope; an entire light transparent lens such as the lens for glasses; a pickup lens of an optical lens such as CD, CD-ROM, WORM (additionally writable: optical disc, MO (rewritable optical disc or photo-magnetic disc), MD (mini-disc) and DVD (digital video disc); the fθ lens of a laser beam printer; the lens for a sensor such as a laser scanning system; and the prism lens for a finder system of camera. The use of the optical disc includes CD, CD-ROM, WORM (additionally writable optical disc, MO (rewritable optical disc or photo-magnetic disc), MD (mini-disc) and DVD (digital video disc). Another use of the optical element includes a light conductive plate of a liquid crystal display, an optical film such as a polarizing film, a retardation film, a light diffusing film; a light diffusing plate: an optical card and a liquid crystal displaying element plate.

Among them, the optical element is suitable for the pickup lens and the lens of laser scanning system since low birefringence is required for such the lens, and is most suitably employed for the pickup lens.

An example of the application of the optical element to an optical pickup apparatus for the optical disc is described below referring FIG. 1 as an example of the use of the optical element of the present invention.

FIG. 1 shows a cross section displaying the schematic constitution of an optical pickup apparatus 1.

As is shown in FIG. 1, the optical pickup apparatus 1 has three kinds of semiconductor laser oscillator LD1, LD2 and LD3 as the light sources. The semiconductor laser oscillator LD1 emits a light beam of a specific wavelength within the range of from 350 to 450 nm (405 nm or 407 nm, for example) for a BD (or AOD) 10. The semiconductor laser oscillator LD2 emits a light beam of a specific wavelength within the range of from 620 to 680 nm for a DVD 20. The semiconductor laser oscillator LD3 emits a light beam of a specific wavelength within the range of from 750 to 810 nm for a CD 30.

A shaver SH1, a splitter BS1, a collimator CL, splitters BS4 and BS5, and a objective lens 15 are successively arranged in line in the direction of the light axis of the blue light beam emitted from the semiconductor laser oscillator LD1, namely in the direction from the bottom to the top of the drawing, and the DB10, DVD 20 or CD 30 as the optical information recording medium is placed at a position facing to the objective lens 15. A cylindrical lens L11, a concave lens L12 and a photo-detector PD1 are successively arranged in line on the right side of the splitter BS1 in FIG. 1.

Splitters BS2 and BS4 are successively arranged in line in the direction of the light axis of red light beam emitted from the semiconductor laser oscillator LD2, namely in the direction of left to right in FIG. 1. A cylindrical lens L21, a concave lens L22 and a photo-detector PD2 are successively arranged under the splitter BS2 in FIG. 1.

Splitters BS3 and BS5 are successively arranged in line in the direction of the light axis of light beam emitted from the semiconductor laser oscillator LD3, namely in the direction of right to left in FIG. 1. A cylindrical lens L31, a concave lens L32 and a photo-detector PD3 are successively arranged under the splitter BS3 in FIG. 1.

The objective lens 15 is arranged so as to face to the BD 10, DVD 20 or CD 30 as the optical information recording medium, and has the function of condensing the light emitted from each of the semiconductor laser oscillator LD-1, LD2 and LD3 to the BD 10, DVD 20 or CD 30. A two dimensional actuator 2 is attached to the objective lens 15 so that the objective lens 15 can be freely moved in the upward and downward direction in FIG. 1 by the two dimensional actuator.

The action in the optical pickup apparatus 1 is simply described below. When information is recorded to the BD 10 or played backed from the BD 10, the semiconductor laser oscillator LD1 emits light. The emitted light is formed light beam L1 illustrated by the solid line in FIG. 1, the light beam is corrected in the shape by passing through the shaver SH1, passed through the splitter SB1 and then made to parallel light by the collimator CL, and further by passing through the splitters BS4, SB5 and the objective lens 15 to form a light spot on the recording surface of 10a of the BD 10.

The light forming the light spot is modulated by the information bits on the recording surface 10a of BD 10 and reflected by the surface 10a, the reflected light is passed through the objective lens 15, splitter BS5 and collimator CL, and then reflected by the splitter BS1 and passed trough the cylindrical lens L11 to be given astigmatic focus error. After that, the light is passed through the concave lens L12 and received by the photo-detector PD1. Thus recording the information to the BD 10 or playback of the information in the BD 10 can be performed.

When information is recorded to the DVD 20 or played backed from the DVD 20, the semiconductor laser oscillator LD2 emits light. The emitted light is formed light beam L2 illustrated by the chain line in FIG. 1, the light beam is passed through the splitter SB2 and reflected by the splitter BS4. After that the light is passed through the splitter SB5 and the objective lens 15 to form a light spot on the recording surface 20a of the DVD 20.

The light forming the light spot is modulated by the information bits on the recording surface 20a of DVD 20 and reflected by the surface 20a, the reflected light is passed through the objective lens 15 and splitter BS5, reflected by the splitters BS4 and BS2, and passed trough the cylindrical lens L21 to be given astigmatic focus error. After that, the light is passed through the concave lens L22 and received by the photo-detector PD2. Thus recording the information to the DVD 20 or playback of the information in the DVD 20 can be performed.

When information is recorded to the CD 30 or played backed from the CD 30, the semiconductor laser oscillator LD3 emits light. The emitted light is formed light beam L3 illustrated by the broken line in FIG. 1, the light beam is passed through the splitter SB3 and reflected by the splitter BS5. After that the light is passed through the objective lens 15 to form a light spot on the recording surface 30a of the CD 30.

The light forming the light spot is modulated by the information bits on the recording surface 30a of CD 30 and reflected by the surface 30a, the reflected light is passed through the objective lens 15 and reflected by the splitters BS5 and BS3, and passed trough the cylindrical lens L31 to be given astigmatic focus error. After that, the light is passed through the concave lens L32 and received by the photo-detector PD3. Thus recording the information to the CD 30 or playback of the information in the CD 30 can be performed.

On the occasion of the recording of information to the DB 10, DVD 20 or CD 30 and the playback of information in the DB 10, DVD 20 or CD 30, the optical pickup apparatus 1 detects the light amount variation caused by the variation in the shape and the position of the light spot on the each of the photo-detectors PD 1, PD2 and PD 3 for focusing and track detecting. In the optical pickup apparatus 1, the objective lens 15 is moved by the two dimensional actuator 2 according to the detecting result by the each of the photo-detector PD1, PD2 and PD3 so that the light from the semiconductor laser oscillator LD1, LD2 or LD3 is focused on the designated track on the recording surface 10a, 20a or 30a of the BD10, DVD 20 or CD 30, respectively.

In the above optical pickup apparatus 1, the optical element according to the present invention is applied to the shaver SH1, the splitters BS1 through BS5, the collimator CL, the objective lens 15, the cylindrical lenses L11, L21 and L31, and the concave lenses L12, L22 and L32. These parts are constituted by the foregoing thermoplastic composite material.

EXAMPLES

Though the present invention is concretely described below referring examples, the present invention is not limited to the examples.

Example 1

<Preparation of Inorganic Particles 1>

In a nitrogen atmosphere, 2.0 g of pentaethoxyniobium was dissolved in 16.59 g of 2-methoxyethanol to prepare a solution. To the resultant solution, a solution containing 0.26 g of lithium hydroxide monohydrate and 18.32 g of 2-methoxyethanol was dropped while stirring. After stirring for 16 hours at room temperature, the reacting liquid was concentrated so that the concentration of the oxide was 5% by weight. Thus a dispersion of $LiNbO_3$ was obtained. To 100 g of the resultant dispersion, 300 g of methanol and 10 ml of 1% by mole of nitric acid aqueous solution were added. To the resultant liquid, a mixture liquid of 100 g of methanol and 6 g of cyclopentyltrimethoxysilane was added spending for 60 minutes and further stirred for 2 hours. Thus obtained transparent dispersion was suspended in ethyl acetate, and white particles were obtained by centrifugal separation. According to observation by TEM, the average diameter of the particles was about 7 nm. The particles were referred to as Inorganic Particles 1.

<Preparation of Inorganic Particles 2>

Into a three-necked flask of colorless transparent Pilex(R) glass equipped with a Liebig reflux condenser and a thermo couple for controlling the reacting temperature, 4 g of TOPO (trioctylphosphine oxide) was installed and heated at. 360° C. in an argon gas atmosphere while stirring with a magnetic stirrer. On the other hand, a raw material solution B was prepared by dissolving 1 mole/liter diethylzinc-hexane solution (1.34 ml, 1.34 millimoles) and bis(trimethylsilyl) sulfide (0.239 g, 0.34 millimoles) in 9 ml of TOP (trioctylphosphine), and loaded in a glass bottle which was then sealed by septum, and the glass bottle was wrapped by aluminum foil without aperture for light shielding, in a glovebox with a dried nitrogen atmosphere. A part (2.0 ml) of the raw material solution B was injected at a time by an injector into the foregoing flask containing TOPO; this time is defined as the initial time of the reaction. Twenty minutes after the initial time of reaction, the heat source was removed, and 2 ml of purified toluene was added at the time when the temperature of the reaction system was cooled to 50° C. for diluting the reacting liquid to form insoluble substance. The insoluble substance was centrifugally (3,000 rpm) precipitated and the supernatant liquid was removed by decantation and dried for 14 hours under vacuum at room temperature. Thus solid powder of Inorganic Particles 2 on which TOPO was coordinated was obtained.

It was confirmed that the Inorganic Particles 2 was crystals of ZnS by the XRD spectrum. The average particle diameter of the ZnS crystals was 5 nm according to the measurement by TEM observation.

<Preparation of Inorganic Particles 3>

Hydrogen sulfide gas diluted to 5% by volume with helium was passed through 100 ml of an alkaline acetonitrile solution of zinc perchlorate hexahydrate in a concentration of $3 \times 10^{-4}$ moles/liter and the resultant solution was added to 100 ml of acetonirile solution containing dodecanthiol in a concentration of $5 \times 10^{-4}$ moles/liter. After that, 200 ml of hexane was added to the above liquid, and then the resultant liquid was subjected to removal of solvent and dried to obtain white powder of Inorganic Particles 3. It was confirmed that the Inorganic Particles 3 was crystals of ZnS by the XRD spectrum. The average particle diameter of these ZnS crystals was 40 nm according to the measurement by TEM observation.

<Preparation of Inorganic Particles 4>

Two liter of a 3.53 moles/liter aqueous solution of aluminum sulfate and two liter of a 7.06 moles/liter aqueous solution of disodium hydrogen phosphate were added by double jet method spending for 10 minutes into 3 liter of an aqueous solution of 0.027 moles/liter of disodium hydrogen phosphate. The pH and temperature during the particle formation were controlled at 3.0 and 30° C., respectively. The pH control was performed by sulfuric acid. After finish of the addition of the solutions, the soluble salts were removed by ultra filtration to obtain a dispersion containing 10% by weight of aluminum phosphate. To 100 g of the dispersion, 300 g of methanol and 10 ml of 1% by mole of nitric acid aqueous solution were added. A mixture of 100 g of methanol and 6 g of cyclopentyltrimethoxysilane was added to thus obtained liquid spending for 60 minutes while stirring at 50° C., and further stirred for 2 hours. Thus obtained transparent dispersion was suspended in ethyl acetate and subjected to centrifugal separation to prepare white fine powder. The average particle diameter of the particles was 20 nm according to the measurement by TEM observation. This powder was referred to as Inorganic Particles 4.

<Preparation of Inorganic Particles 5>

An 50 mmol/liter aqueous solution of silver acetate was prepared by dissolving silver acetate and potassium sulfite in water. Then a 50 mmol/liter aqueous solution of gallium sulfate was prepared by dissolving 1.3 g of gallium sulfate and 2.25 g of L-tartaric acid in 100 ml of water. At room temperature, 10 ml of the 50 mmol/liter solution of silver acetate, 10 ml of the 50 mmol/liter solution of gallium sulfate and 20 ml of a 50 mmol/liter aqueous solution of potassium sulfite were mixed and the pH of the resultant mixture was adjusted to 7 by KOH. Ten milliliters of a 4% solution of poly(vinyl pyrrolidone) having a molecular weight of from 10,000 to 15,000 was further added as a dispersing agent and the solution was stirred for 10 minutes. Then 0.76 g of sodium tetrahydroborate as a reducing agent was dissolved in 10 ml of water and the solution was added just after the preparation to the above obtained mixture solution to perform reducing reaction. The resultant mixture liquid was stirred for 2 hours at 20° C. for completing the reaction. Thus a colloid like dispersion was obtained. The dispersion was subjected to a surface treatment in the same manner as in the preparation of Inorganic Particles 4. A white fine powder was obtained. According to observation by the TEM, the average particle size of the powder was 6 nm. It was confirmed that the particle has a crystal structure of $AgGaS_2$ by the XRD spectrum. The powder was referred to as Inorganic Particles 5.

<Preparation of Inorganic Particles 6>

To 5 g of particles of aluminum oxide C having an average particle diameter of 13 nm, manufactured by Nippon Aerogil Co., Ltd., 300 g of methanol and 10 ml of 1% by mole of nitric acid aqueous solution were added. A mixture liquid of 100 g of methanol and 6 g of cyclopentyltrimethoxysilane was added to the above resultant liquid spending 60 minutes while stirring at 50° C., and the liquid was further stirred for 2 hours. Thus obtained transparent dispersion was suspended in ethyl acetate and subjected to centrifugal separation. A white powder was obtained. According to observation by the TEM, the average particle size of the powder was 15 nm. The powder was referred to as Inorganic Particles 6.

<preparation of Inorganic Particles 7>

A white powder was obtained in the same manner as in the preparation of Inorganic Particles 5 except that aluminum oxide having an average particle diameter of 37 nm was used, which was obtained from Kemco International Associates Co., Ltd. The powder was referred to as Inorganic Particles 7.

Additional to Inorganic Particles 1 through 7, hydrophobilized silica MAX50 and RX300 manufactured by Nippon Aerogil Co., Ltd. were evaluated as Inorganic Particles 8 and 9, respectively.

The characteristics of the inorganic particles are listed in Table 2.

TABLE 2

| Sample name | Composition | Particle diameter (nm) | Refractive index |
|---|---|---|---|
| Inorganic Particles 1 | LiNbO$_3$ | 7 | 2.26 |
| Inorganic Particles 2 | ZnS | 5 | 2.37 |
| Inorganic Particles 3 | ZnS | 40 | 2.37 |
| Inorganic Particles 4 | AlPO$_4$ | 20 | 1.53 |
| Inorganic Particles 5 | AgGaS$_2$ | 6 | 2.88 |
| Inorganic Particles 6 | Al$_2$O$_3$ | 15 | 1.70 |
| Inorganic Particles 7 | Al$_2$O$_3$ | 40 | 1.70 |
| Inorganic Particles 8 | SiO$_2$ | 7 | 1.46 |
| Inorganic Particles 9 | SiO$_2$ | 35 | 1.46 |

<<Preparation of Resin Composition>>

Each of the resins was dried for 8 hours at 80° C. and the Inorganic Particles 1 through 8 were each dried for 4 hours at 200° C. for preparation before the kneading.

<Preparation of Resin Composition 1>

A powder prepared by previously mixing 4 g of Inorganic. Particles 1 and 16 g of Inorganic Particles 7 was added to 40 g of molten cyclic olefin polymer Zeonex 330R, manufactured by Zeon Corp., and kneaded under the molten state to disperse the inorganic particles, thus Resin Composition 1 was obtained. The kneading was carried out for 5 minutes after completion of the addition of the powder by a kneading apparatus manufactured by HAAKE at a setting temperature of 200° C. and a rotating rate of 30 rpm.

<Preparation of Resin Compositions 2 through 16>

Resin Composition 2 through 16 were prepared in the same manner as in the preparation of Resin Composition 1 except that the dispersed amounts of the inorganic particles were varied so that the amounts of the inorganic particles were adjusted to those listed in Table 3.

<Preparation of Resin Compositions 17 through 22>

Resin Compositions 17 through 22 were prepared in the same manner as in the preparation of the above resin composition except that the resin was replaced by 5014DP, manufactured by Mitsui Chemicals Inc., and the adding amounts of the inorganic particles were varied so that the amounts of the dispersed inorganic particles were adjusted to those listed in Table 3. The kneading was carried out at a setting temperature of 180° C. and a rotating rate of 30 rpm.

<<Evaluation of Resin Composition>>

<Measurement of Refractive Index>

The above prepared Resin Compositions 1 through 22 were each molten and formed into a shape of test plate with a thickness of 0.5 mm, and the refractive index of each of the plates was measured at a wavelength of 588 nm by an Abbe refractometer DR-M2, manufactured by Atago Co., Ltd. The temperature for the measurement was varied from 10° C. to 30° C., and the refractive index nd25 at 25° C. and the variation rate depending temperature of the refractive index dn/dT were determined.

<Measurement of Transmittance>

The above prepared Resin Compositions 1 through 22 were each molten and formed into a shape of test plate with a thickness of 3.0 mm, and the transmittance of each of the samples was measured just after the preparation of the sampleby a method according to ASTM D1003 using a turbidity meter T-2600DA, manufactured by Tokyo Denshoku Co., Ltd. Thus measured transparence was referred to as Transmittance A (%). The test plates were stored for 48 hours at 65° C., and the transmittance of each of the test plates after the accelerated aging test was measured in the same manner as above. Thus measured transmittance was referred to as Transparence B (%).

The sample having a transmittance of 70% or less was judged as not suitable for the optical element since the transparency was deficient.

Results by the above measurements are listed in Table 3.

TABLE 3

| | Thermoplastic resin | | Particles 1 | | | | Particles 2 | | | | Resin composition | | | | |
|---|---|---|---|---|---|---|---|---|---|---|---|---|---|---|---|
| | Kind | *1 | Kind | *1 | *2 | *3 | Kind | *1 | *2 | *3 | *4 | dn/Dt (10$^{-6}$/K) | *5 | *6 | Remarks |
| Resin Composition 1 | ZEONEX330R | 1.51 | Inorganic Particles 1 | 2.26 | 7 | 10 | Inorganic Particles 8 | 1.46 | 7 | 40 | 1.58 | −82 | 91% | 90% | Inv. |
| Resin Composition 2 | ZEONEX330R | 1.51 | Inorganic Particles 1 | 2.26 | 7 | 25 | Inorganic Particles 8 | 1.46 | 7 | 25 | 1.69 | −65 | 90% | 90% | Inv. |
| Resin Composition 3 | ZEONEX330R | 1.51 | Inorganic Particles 1 | 2.26 | 7 | 40 | Inorganic Particles 8 | 1.46 | 7 | 10 | 1.80 | −42 | 89% | 88% | Inv. |
| Resin Composition 4 | ZEONEX330R | 1.51 | Inorganic Particles 1 | 2.26 | 7 | 25 | Inorganic Particles 9 | 1.46 | 35 | 25 | 1.65 | −90 | 65% | 45% | Comp. |
| Resin Composition 5 | ZEONEX330R | 1.51 | Inorganic Particles 2 | 2.37 | 5 | 10 | Inorganic Particles 8 | 1.46 | 7 | 40 | 1.59 | −21 | 87% | 89% | Inv. |
| Resin Composition 6 | ZEONEX330R | 1.51 | Inorganic Particles 3 | 2.37 | 40 | 10 | Inorganic Particles 8 | 1.46 | 7 | 40 | *7 | *7 | 30% | 27% | Comp. |
| Resin Composition 7 | ZEONEX330R | 1.51 | Inorganic Particles 5 | 2.88 | 6 | 10 | Inorganic Particles 8 | 1.46 | 7 | 40 | 1.63 | −51 | 75% | 72% | Inv. |
| Resin Composition 8 | ZEONEX330R | 1.51 | Inorganic Particles 2 | 2.37 | 5 | 10 | Inorganic Particles 9 | 1.46 | 35 | 40 | *7 | *7 | 45% | 35% | Comp. |
| Resin Composition 9 | ZEONEX330R | 1.51 | Inorganic Particles 6 | 1.70 | 15 | 25 | Inorganic Particles 8 | 1.46 | 7 | 25 | 1.60 | −60 | 90% | 90% | Inv. |
| Resin Composition 10 | ZEONEX330R | 1.51 | Inorganic Particles 7 | 1.70 | 40 | 25 | Inorganic Particles 8 | 1.46 | 7 | 25 | 1.54 | *7 | 48% | 40% | Comp. |

TABLE 3-continued

| | Thermoplastic resin | | Particles 1 | | | | Particles 2 | | | | Resin composition | | | | |
|---|---|---|---|---|---|---|---|---|---|---|---|---|---|---|---|
| | | | | | | | | | | | | dn/Dt | | | |
| | Kind | *1 | Kind | *1 | *2 | *3 | Kind | *1 | *2 | *3 | *4 | $(10^{-6}/K)$ | *5 | *6 | Remarks |
| Resin Composition 11 | ZEONEX330R | 1.51 | Inorganic Particles 1 | 2.26 | 7 | 25 | Inorganic Particles 4 | 1.53 | 20 | 25 | 1.69 | −46 | 85% | 83% | Inv. |
| Resin Composition 12 | ZEONEX330R | 1.51 | Inorganic Particles 2 | 2.37 | 5 | 25 | Inorganic Particles 4 | 1.53 | 20 | 25 | 1.73 | −25 | 84% | 82% | Inv. |
| Resin Composition 13 | ZEONEX330R | 1.51 | Inorganic Particles 2 | 2.37 | 5 | 10 | Inorganic Particles 4 | 1.53 | 20 | 20 | 1.59 | −45 | 91% | 88% | Inv. |
| Resin Composition 14 | ZEONEX330R | 1.51 | Inorganic Particles 6 | 1.70 | 15 | 25 | Inorganic Particles 4 | 1.53 | 20 | 25 | 1.57 | −55 | 93% | 92% | Inv. |
| Resin Composition 15 | ZEONEX330R | 1.51 | Inorganic Particles 8 | 1.46 | 7 | 40 | — | — | — | — | 1.49 | −88 | 84% | 65% | Comp. |
| Resin Composition 16 | ZEONEX330R | 1.51 | Inorganic Particles 1 | 2.26 | 7 | 40 | — | — | — | — | 1.82 | −58 | 67% | 46% | Comp. |
| Resin Composition 17 | APL5014DP | 1.54 | Inorganic Particles 1 | 2.26 | 7 | 25 | Inorganic Particles 4 | 1.53 | 20 | 25 | 1.69 | −33 | 87% | 86% | Inv. |
| Resin Composition 18 | APL5014DP | 1.54 | Inorganic Particles 2 | 2.37 | 5 | 25 | Inorganic Particles 4 | 1.53 | 20 | 25 | 1.74 | −26 | 89% | 88% | Inv. |
| Resin Composition 19 | APL5014DP | 1.54 | Inorganic Particles 3 | 2.37 | 40 | 25 | Inorganic Particles 4 | 1.53 | 20 | 25 | *7 | *7 | 42% | 35% | Comp. |
| Resin Composition 20 | APL5014DP | 1.54 | Inorganic Particles 5 | 2.88 | 6 | 25 | Inorganic Particles 4 | 1.53 | 20 | 25 | 1.86 | −11 | 78% | 75% | Inv. |
| Resin Composition 21 | APL5014DP | 1.54 | Inorganic Particles 6 | 1.70 | 15 | 25 | Inorganic Particles 4 | 1.53 | 20 | 25 | 1.62 | −53 | 90% | 88% | Inv. |
| Resin Composition 22 | APL5014DP | 1.54 | Inorganic Particles 7 | 1.70 | 40 | 25 | Inorganic Particles 4 | 1.53 | 20 | 25 | 1.57 | *7 | 51% | 45% | Comp. |

*1: refractive index,
*2: Average particle diameter (nm),
*3: Content (% by weight)
*4: Refractive index nd25,
*5: Transmittance A,
*6: Transmittance B,
*7: Cannot be measured
Inv.: Inventive,
Comp.: Comparative As is cleared from the results listed in Table 3, the resin compositions according to the present invention are smaller in the temperature dependency and higher in the transparency than those of the comparative samples. Furthermore, it is understood that the lowering in the transparency of the inventive resin compositions is very small after the accelerated aging and the inventive resin compositions are extremely suitable for the optical elements.

It is confirmed as a result of the evaluation of plastic optical element prepared by the above rein compositions that the optical elements produced by the resin compositions according to the present invention have superior Optical characteristics and are excellent in the resistivity to deterioration of the material such as occurrence of the white turbid even when the elements are irradiated by Blue-Ray to be used for recording and playback of CD and DVD.

What is claimed is:

1. A thermoplastic composite material comprising:
   (i) a thermoplastic resin comprising an organic polymer; and
   (ii) at least two types of inorganic particles having an average diameter of 1-30 nm dispersed in said thermoplastic resin,
   wherein said at least two types of inorganic particles have different refractive indexes.

2. The thermoplastic composite material of claim 1, wherein
   nh represents a refractive index of the thermoplastic resin and np1 represents a smallest refractive index among refractive indexes of the at least two types of inorganic particles, nh and np1 satisfying Formula (A) below:

$nh-0.1 \leq np1 \leq nh+0.1$.                                                                 Formula (A)

3. The thermoplastic composite material of claim 2, wherein
   np2 represents one of the refractive indexes of the at least two types of inorganic particles other than np1, np1 and np2 satisfying Formula (B) below:

$0.1 \leq np2-np1 \leq 1.0$.                                                                    Formula (B)

4. The thermoplastic composite material of claim 3, wherein
   a weight content of inorganic particles having the refractive index of np1 is not less than a content of inorganic particles having the refractive index of np2.

5. The thermoplastic composite material of claim 3, wherein
   a weight content of inorganic particles having the refractive index of np1 is not more than a content of inorganic particles having the refractive index of np2.

6. An optical element formed by using the thermoplastic composite material of claim 1.

7. A thermoplastic composite material comprising:
   (i) a thermoplastic resin comprising an organic polymer; and
   (ii) at least two types of particles having an average diameter of 1-30 nm dispersed in the thermoplastic resin,
   wherein
   the at least two types of particles have different refractive indices; and the at least two types of inorganic particles are present in an amount ranging from 20 to 70% by weight, relative to the weight of the thermoplastic resin.

8. The thermoplastic composite material of claim 7, wherein nh represents a refractive index of the thermoplastic resin and np1 represents a smallest refractive index among refractive indexes of the at least two types of inorganic particles, nh and np1 satisfying Formula (A) below:

$$nh-0.1 \leq np1 \leq nh+0.1. \quad \text{Formula (A)}$$

9. The thermoplastic composite material of claim 8, wherein np2 represents one of the refractive indexes of the at least two types of inorganic particles other than np1, np1 and np2 satisfying Formula (B) below:

$$0.1 \leq np2-np1 \leq 1.0. \quad \text{Formula (B)}$$

10. The thermoplastic composite material of claim 9, wherein a weight content of inorganic particles having the refractive index of np1 is not less than a content of inorganic particles having the refractive index of np2.

11. The thermoplastic composite material of claim 9, wherein a weight content of inorganic particles having the refractive index of np1 is not more than a content of inorganic particles having the refractive index of np2.

12. An optical element formed by using the thermoplastic composite material of claim 7.

13. A thermoplastic composite material comprising:

(i) a thermoplastic resin comprising an organic polymer; and (ii) at least two types of inorganic particles having an average diameter of 1-10 nm dispersed in said thermoplastic resin, wherein the at least two types of inorganic particles have different refractive indexes.

* * * * *

UNITED STATES PATENT AND TRADEMARK OFFICE
CERTIFICATE OF CORRECTION

PATENT NO. : 7,649,035 B2
APPLICATION NO. : 11/295488
DATED : January 19, 2010
INVENTOR(S) : Yasuo Taima It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this

Twenty-eighth Day of December, 2010

David J. Kappos
*Director of the United States Patent and Trademark Office*